Oct. 23, 1962 R. E. KEMELHOR 3,059,915
UNITARY FLUID MAGNETIC SPRING, SHOCK AND LOCKOUT DEVICE
Filed June 21, 1961 2 Sheets-Sheet 1

ROBERT E. KEMELHOR
INVENTOR.

BY
ATTORNEY

— — — Magnetized
———— Unmagnetized

ROBERT E. KEMELHOR
INVENTOR.

United States Patent Office 3,059,915
Patented Oct. 23, 1962

3,059,915
UNITARY FLUID MAGNETIC SPRING, SHOCK
AND LOCKOUT DEVICE
Robert E. Kemelhor, 6211 Redwing Court,
Bethesda, Md.
Filed June 21, 1961, Ser. No. 118,576
19 Claims. (Cl. 267—1)

The present invention relates to energy absorption devices and more particularly to an improved unitary spring, shock and lockout device.

A mechanism which combines in a single article the features of a spring, a shock absorber and a lockout device is described in U.S. Patent No. 2,940,749 which issued to this same inventor. The problem to which that invention and the present invention are directed is the provision of a resilient or shock mounting for a piece of equipment which mounting must be capable, whenever deemed necessary, to be locked solidly in a fixed position. This is done conventionally by employment of a spring or shock absorber in conjunction with a mechanical lockout arrangement; however, if it is desired that any intermediate condition be attained, these arrangements become incompetent. That is, if a non-linear force deflection characteristic is desired, or if any damping between normal damping and solid lockout is desired, something more than these inflexible devices is required.

What is required in these cases, then, is a unitary mechanism having a variable spring constant, a variable damping coefficient and additionally a lockout characteristic which will permit the mechanism to provide a solid mounting when desired. The invention described in the aforementioned U.S. Patent No. 2,940,749 is directed toward fulfilling these requirements and indeed does so by the utilization of a magnetic fluid in a novel plunger and cylinder configuration.

The present invention also utilizes magnetic fluid, but in a unique cylinder arrangement which permits the use of an additional fluid or fluids to provide a novel concept to produce an improvement in a unitary liquid spring, shock and lockout device with many advantages over prior art devices including that described in U.S. Patent No. 2,940,749. For example, the present invention provides a wider range of variable spring rate, greater variable damping characteristics over a range of strokes, less power requirement since the unique cylinder configuration permits control with a much smaller size solenoid coil, smaller volume of magnetic fluid, resultant compact design, and control of energy absorption in either compression or extension.

The object of the present invention, therefore, is to provide an improvement in a unitary liquid spring, shock and lockout device which results in more efficient and flexible control. Also provided by this invention is such a unitary mechanism which is more compact in size, lighter in weight, and much more economical in power requirement. Other objects and many of the attendant advantages of the present invention will be readily appreciated as the same becomes better understood by reference to the following detailed descripiton when considered in connection with the accompanying drawing in which:

Briefly, the present invention contemplates a piston and cylinder arrangement with the provision of additional chambers having floating pistons or fluid barriers contained therein, the purpose of the fluid barriers being to separate the various fluids employed and also to transmit pressure from one fluid to another. One of the fluids will always be a magnetic fluid so that by magnetization thereof, a means is provided for controlling the transmission of pressure from one fluid to another. Provision of a damping and lockout control system is also made, a partial automatic or manual control being provided by a rheostat, or a fully automatic control being provided by a sensing device used in conjunction with a signal amplifier, an amplidyne, a power supply and a feedback potentiometer.

Figure 1:
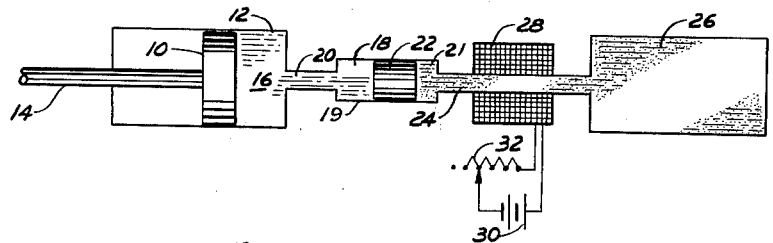
FIGURE 1 is a diagrammatic representation of one embodiment of the present invention in which two different fluids may be employed.

Referring now to the drawing in greater detail, in FIG. 1 is seen a simplified representation of one embodiment of the present invention in which a piston 10 is arranged to move within a cylinder 12, an appropriate connecting rod 14 being coupled to the piston for communication thereof with the exterior of the cylinder. This arrangement of the piston 10 and the cylinder 12 forms an expansible chamber 16 within the cylinder, this chamber being coupled to a second chamber 18 in a second cylinder 19 through a passageway 20. Slidably movable within the second cylinder 19 is a fluid barrier or floating piston 22 which divides the cylinder interior into the chamber 18 and a third chamber 21. A magnetic orifice 24 is coupled to the chamber 21 and serves to communicate it with a fourth chamber 26. A solenoid coil 28 is positioned adjacent the orifice 24 to impress a magnetic field therearound, a source of electrical energy 30 and a rheostat 32 being provided to produce variable energization of the coil. An "off" position is provided on the rheostat in order that the orifice 24 may be completely unmagnetized when desired.

In the chamber 16, the passageway 20 and in the chamber 18 is disposed a first fluid; and on the other side of the fluid barrier 22 in the chamber 21 is a second fluid which is disposed to be contained in the passageway 24 and the chamber 26. For the purpose of this invention, the first fluid may range from a relatively incompressible fluid such as Cellulube 220 phosphate ester fluid to a relatively compressible fluid such as General Electric Versilube or General Electric silicon fluid SF96–50. The second fluid is a magnetic slurry of the type which is described in U.S. Patent No. 2,940,749 and in which iron particles are suspended in a silicone fluid. A 50 percent mixture, by volume, of iron particles of 3 to 8 microns average diameter in a silicone fluid such as Dow Corning No. 200 or 550 with small amounts of suspension additives. A polyoxyethylated vegetable oil such as Emulphor produced by The General Analine and Film Company or a paint additive such as Thixin, may be used as the suspension additive.

In the operation of the device depicted in FIG. 1, a pressure impressed on the piston 10 through the rod 14 is transferred to the first fluid, a portion of which pressure is transmitted through the fluid barrier 22 to the magnetic fluid. If the solenoid 28 is unenergized, the resulting pressure is transmitted through the magnetic orifice 24 to the reservoir of fluid in the chamber 26. Thus the spring rate or the rate of energy absorption of the device in this condition is dependent on the compressibility characteristics of both the first fluid and the magnetic fluid. If, however, the coil 28 is energized, the effective viscosity of the magnetic fluid is increased to tend to render the reservoir of fluid in the chamber 26 inaccessible to the pressure transmitted by the fluid barrier 22. Full energization of the coil 28 causes the magnetic fluid to become virtualy stiff, and of course if any lesser degree of magnetization is effected, the magnetic fluid is proportionately affected so that in this manner the spring rate of the device may be varied considerably. It is seen that not only is the spring rate affected by varying the energization of the coil 28, but also the damping characteristics of the device as the rate of fluid flow through the orifice 24 is varied.

Figure 5:
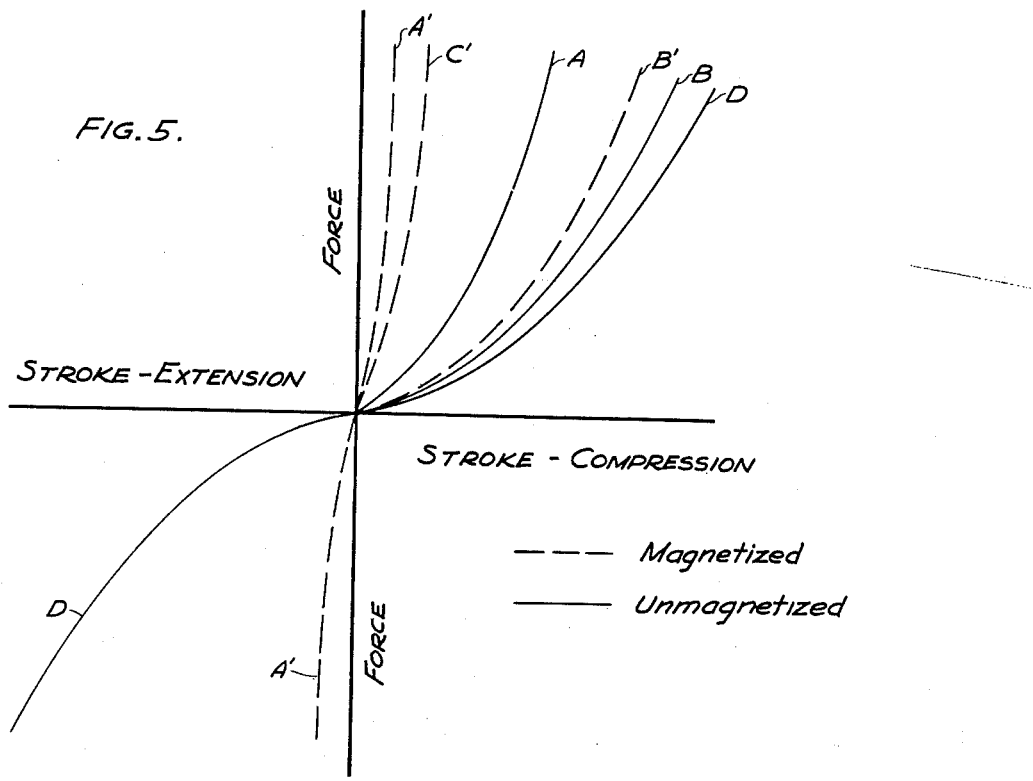
FIGURE 5 is a plot of the static spring characteristic for the various embodiments of the present invention.

If the first fluid is a relatively incompressible fluid, as previously described, the spring characteristic of the device of FIG. 1 in the unmagnetized condition can be represented by curve A in FIG. 5 in which the force on the piston is plotted against the stroke. When the coil 28 is fully magnetized, the spring characteristic becomes that as indicated by curve A'. If the first fluid, on the other hand, is a relatively compressible fluid, the spring characteristics of the device of FIG. 1 are represented by curves B and B' in the unmagnetized and fully magnetized condition, respectively.

Figure 2:
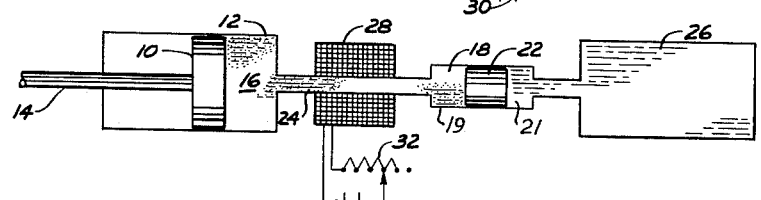
FIGURE 2 is a diagrammatic representation of a second embodiment of the present invention utilizing two different fluids in a different arrangement from that of FIGURE 1.

FIG. 2 shows a second embodiment of the present invention in which the arrangement depicted in FIG. 1 is modified slightly in that the magnetic orifice 24 is now positioned between the cylinder 12 and the second cylinder 19. In this arrangement, the first fluid, which is between the piston 10 and the fluid barrier 22, is magnetic fluid; and the second fluid which is on the other side of the fluid barrier 22 and in the chambers 21 and 26 may be a fluid similar to that as previously described having compressibility characteristics ranging relatively from low to high.

In the use of this device depicted in FIG. 2, it is seen that if the coil 28 is unenergized, pressure impressed on the piston 10 will be transmitted through the fluid barrier 22 to the reservoir of fluid in the chamber 26. But if the coil is energized, the magnetic fluid tends to stiffen up so that there is less tendency for the pressure to be transmitted therethrough to the second fluid, the degree of transmission of the pressure depending upon the degree of energization of the solenoid. If the coil is fully energized, the spring rate of the device will depend almost solely on the compressibility of the magnetic fluid in the chamber 16. In this case, the spring characteristic may be represented by the curve C' regardless of the compressibility of the second fluid. However, where the coil 28 is unenergized, the second fluid has a prime role in determining the resulting spring rate. Thus curve D indicates the characteristic of an unmagnetized device in which the second fluid is a highly compressible fluid, and curve A represents a situation where the second fluid is relatively incompressible as well as the situation described in connection with FIG. 1.

Examination of the curves in FIG. 5 reveals that in the device of FIG. 2 where the first fluid is magnetic fluid and the second fluid is a highly compressible fluid, there is an extremely wide range of variable spring rate. That is, the spring rate may vary from C' to curve D as the energization of the coil 28 varies from unenergized to fully energized. In order to extend this range, especially at the end where the coil 28 is fully energized and it is desired to attain lockout conditions, a third embodiment of the present invention may be utilized. Thus in FIG. 3 can be seen an arrangement where the embodiment of FIG. 1 has been modified by the insertion of an additional and third cylinder 34 having a fluid barrier 36 therein to form chambers 38 and 40. The third cylinder 34 is inserted between the magnetic orifice 24 and the chamber 26. In this device, the fluid between the piston 10 and the first fluid barrier 22 is preferably a relatively incompressible fluid, while the fluid in the magnetic orifice between the two fluid barriers 22 and 36 is magnetic fluid, and the fluid on the other side of the fluid barrier 36 and in the chambers 40 and 26 is a highly compressible fluid.

In operation, when it is desired that lockout conditions obtain, the coil 28 is fully energized so that the magnetic fluid becomes virtually solid thus allowing the incompressible fluid only to be available for absorbing energy. Under these lockout conditions, the spring rate would be represented by the curve A' in FIG. 5. If it is desired that the softest spring be provided, then the coil is unenergized so that the pressure is transmitted from the piston 12 through the first fluid, the first fluid barrier 22, the magnetic fluid and the second fluid barrier 36 to the highly compressible fluid in the chamber 26. In this case, the spring rate would be as indicated by curve D. It is seen then that by the arrangement of FIG. 3, the spring rate characteristic may vary from curve A' to D, thus extending the range of the device of FIG. 2, which range is indicated by the curves C' to D.

Figure 3:
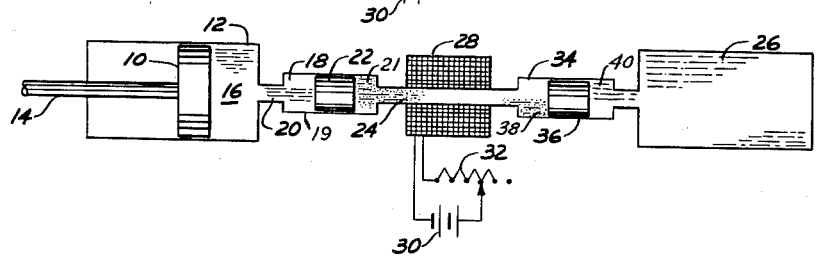
FIGURE 3 is a diagrammatic representation of still another embodiment of this invention in which three different fluids may be employed.

It is apparent that in the device of FIG. 3, any combination of fluids may be used, but in order to attain the widest possible range of variation in spring characteristics, the selection of fluid is preferably as described above.

Figure 4:
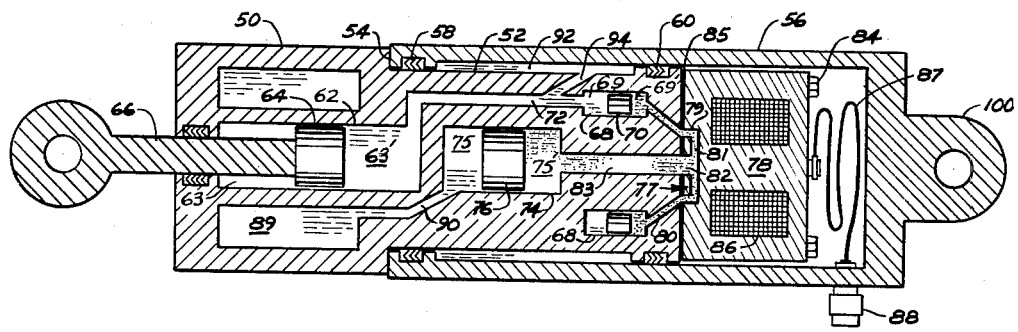
FIGURE 4 is an elevation in simplified section of a fourth embodiment of the present invention in which three different fluids are utilized in an arrangement providing control in both compression and extension.

In FIG. 4 is depicted a fourth embodiment of the present invention in which the device of FIG. 3 is more compactly arranged and includes, in addition, a feature permitting the device to operate in both compression and extension. This fourth embodiment of the unitary spring, shock and lockout device of the present invention comprises a first cylindrical member 50 formed from a nonmagnetic material such as stainless steel, Monel metal, brass, etc. and having a reduced outer portion 52 to form an annular shoulder 54 thereon. Telescopingly engageable with the first member 50 in fluid tight relationship is a second member 56 of hollow cylindrical shape which is also preferably of nonmagnetic material. The open end of the second member 56 is adapted to engage the shoulder 54 and is provided with annular sealing means 58 which engage the reduced diameter portion 52. Formed around the periphery of the reduced diameter portion 52 is a second annular sealing means 60 which engages the inner wall of the member 56.

A cylinder 62 is provided in the first member 50 and houses a piston 64 slidably movable therein to form chamber 63 and 63'. Attached to the piston is a rod 66 for communication thereof with the exterior of the first member 50. Formed in the first member 50 is at least one second cylinder 68 having a pair of chambers 69 and 69' separated by a fluid barrier or floating piston 70 slidably contained therein, a passageway 72 communicating the first and second cylinders. A third cylinder 74 having a pair of chambers 75 and 75' separated by a fluid barrier or floating piston 76 therein is provided in the first member 50 and if placed in communication with each of the second cylinders 68 through a magnetic orifice 77. The magnetic orifice 77 is contained in an orifice body 78 and includes longitudinal inlet passageways 79 which are communicable with passageways 80 leading from each of the cylinders 68 in the first cylindrical member 50. Connected to each of the passageways 79 is an intermediate radial bore 81 that is coupled to a main outlet bore 82. A central passageway 83 in the member 50 serves to communicate the chamber 74 with the main bore 82.

The orifice body 78 is formed of magnetic material and is appropriately mated with the member 50 and coupled thereto in tight relationship by bolts 84, a suitable gasket 85 being positioned intermediate the member 50 and the body 78. Thus it is seen that each of the cylinders 68 is placed in communication with the cylinder 74 through the passageways 80, longitudinal passageway 79, radial bore 81, main bore 82 and the central passageway 83. The magnetic orifice 77 comprises those passageways and bores which are within the body 78 and includes the longitudinal passageway 79, radial bore 81 and the main bore 82.

Mounted on the body 78 and in close proximity to the magnetic orifice 77 is a solenoid coil 86 which is connected to a source of electrical energy and a rheostat (not shown) through a flexible lead 87 and a suitable fitting 88. The coil 86 is located in such relationship with the magnetic orifice 77 that the various passageways and bores of the latter lie in the main portion of the flux path of the coil. Because the body 78 is magnetic and members 50 and 56 are non-magnetic, a sharper flux path is defined to permit the coil to exert greater effect over the region of the magnetic orifice 77.

Also provided in the first member 50 is a chamber or reservoir 89 which, through a passageway 90, is in direct communication with the chamber 75.

As previously mentioned, the first and second members, 50 and 56, respectively, are in telescoping relationship, the seal 58 of the member 56 engaging the reduced diameter portion 52 of the first member 50, and the seal 60 of the first member 50 engaging the inner wall of the member 56. It is seen then that an expansible chamber 92 is formed between the members 50 and 56 between the limits posed by the seals 58 and 60, the expansible chamber being contracted when the members are telescoped in extension and expanded when the members are telescoped in compression. For communication of the expansible chamber 92 with the chambers 63' and 69, a passageway 94 is provided which is also coupled to the passageway 72.

In operation, the device of FIG. 4 may be used in compression or extension, the operation in compression being similar to that of the embodiment of FIG. 3. That is, pressure transmitted through the piston 64 is delivered to the first fluid which in this case is relatively incompressible. This pressure is then transferred to the first fluid barrier 70 which in turn transmits the pressure to the magnetic fluid. The magnetic fluid is metered through the magnetic orifice 77 and, if the coil 86 is unenergized, the pressure is transmitted through the second fluid barrier 76 for absorption in the highly compressible fluid in the chamber 89. When it is desired that a stiffer spring be presented to the input energy, the coil 86 is energized thereby inducing a magnetic field around the orifice 77 and consequently affecting the magnetic fluid therein by increasing its effective viscosity. The degree of stiffening of the magnetic fluid is, as previously described, dependent upon the strength of the magnetic field, so that an effective means is provided by which energy may be selectively transmitted to the highly compressible fluid. If the coil is fully energized, the magnetic fluid becomes virtually solid so that a negligible amount of pressure is transmitted to the third and highly compressible fluid, thereby allowing only the incompressible fluid and a small amount of magnetic fluid to be available for energy absorption. In this situation where the coil is fully energized, lockout conditions occur since the device is substantially "solid." Thus the rheostat for controlling the input to the solenoid may, if desired, be conveniently calibrated for soft, medium, stiff and lockout positions, or the like.

In extension, the device of FIG. 4 is operated by energy impressed on the piston rod 66 in a direction which tends to move the piston 64 to the left in the drawing. It is seen that when the piston is against the end wall of the first member 50, the pressure is transferred from the piston thereto so that the member 50 tends to be telescoped outwardly from the second member 56, assuming of course that the latter is constrained at its pinned end 100. Extension of the member 50 from the second member 56 causes contraction of the expansible chamber 92 which, like the chamber 63', contains a relatively incompressible fluid. The pressure imparted to this first fluid is transmitted to the only yielding object available, the first fluid barrier 70 which in turn as in compression, transfers pressure to the magnetic fluid for control thereby. Thus the device of FIG. 4 is made to operate similarly in compression and extension as far as the energy absorption, damping and lockout are concerned.

Figure 6:
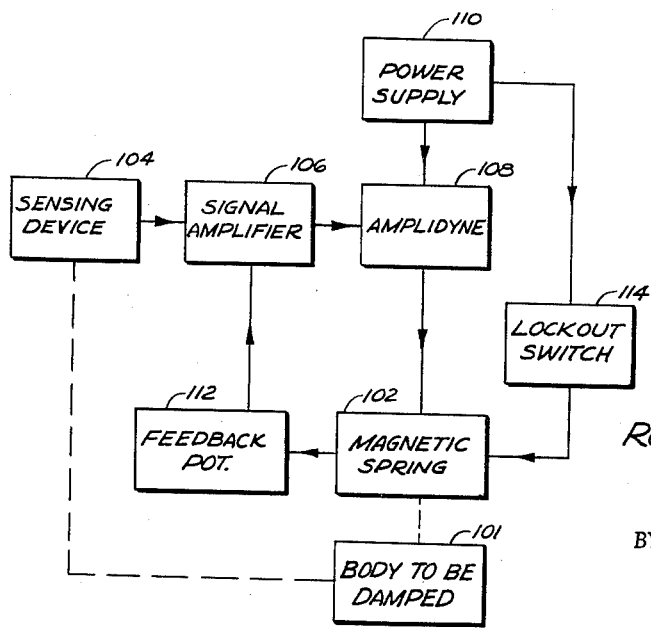
FIGURE 6 is a block diagram of an automatic control system for the present invention.

In FIG. 6 is shown a schematic of a fully automatic damping and lockout control system including in combination the magnetic fluid spring, shock and lockout device of FIG. 4. In this arrangement, a body 101 to be damped is mechanically coupled to a magnetic spring, shock and lockout device 102. A sensing device 104 such as an accelerometer or a transducer, is also mechanically coupled to the body 101 to sense the motion thereof and to transmit an appropriate signal to a signal amplifier 106. Connected to the amplifier 106 is a servo type control device or an amplidyne 108 which, in accordance with the signal from the amplifier controls the current input from a power supply 110 to the solenoid coil of the magnetic device 102. Closing the loop between the magnetic device 102 and the signal amplifier 106 is a feedback potentiometer 112. A bypass switch 114 directly connects the magnetic device 102 to the power supply 110 to permit full magnetization of the coil in the magnetic device thereby allowing lockout conditions to obtain. Thus the damping and spring characteristics of the magnetic spring device 102 are automatically controlled by means of a closed loop shock and vibration sensing and monitoring network in which a dynamic input to the body to be damped 101 is remotely sensed by the pickup 104, amplified, channeled through a current control device and thence directed to the coil of the magnetic spring device 102. Provision of the bypass switch 114 permits the control of the device 102 to extend to full lockout as desired. Additionally, the potentiometer 112 may be calibrated for damping ranging from light to heavy for convenience of control.

In the foregoing discussion, much reference has been made to the terms "relatively compressible" and "relatively incompressible," and specific examples were given of fluids in liquid state which possess characteristics of compressibility which were relatively compressible or relatively incompressible with respect to other liquids. Not to be excluded however from the teaching of the present invention is the fact that highly compressible fluids, such as a gas, may be utilized for the fluids except the magnetic fluid.

Obviously many modifications and variations of the present invention are possible in the light of the above teachings. It is therefore to be understood that within the scope of the appended claims, the invention may be practiced otherwise than as specifically described.

What is claimed is:

1. An improved unitary fluid magnetic spring, damper and lockout device, comprising, a first member, a second member telescopingly slidable with said first member, a first cylinder in said first member, a piston movable within said cylinder and having a rod connected thereto for communicating said piston with the exterior of said first cylinder, a second cylinder within said first member and having a fluid barrier movable therein, connecting means for communicating said first and second cylinders, a third cylinder having a second fluid barrier movable therein, a magnetic orifice for communicating said second and third cylinders, means for inducing a variable magnetic field in said magnetic orifice, a first fluid confined in said first cylinder and connecting means and second cylinder between said piston and said first fluid barrier, a second fluid confined in said magnetic orifice and said second and third cylinders between said first and second fluid barriers, said second fluid being magnetic, and a third fluid in said third cylinder on the side of said second fluid barrier opposite to that on which said second fluid acts.

2. The device as recited in claim 1 wherein said first fluid is relatively incompressible and said third fluid is relatively compressible.

3. The device as recited in claim 1 wherein said first and third fluids are highly compressible.

4. The device as recited in claim 1 with additionally a fourth cylinder in said first member and a second connecting means for communicating said third and fourth cylinders.

5. The device as recited in claim 1 with additionally first and second structure on said first and second members, respectively, to form an expansible chamber therebetween, said expansible chamber tending to enlarge when said first and second members are telescoped together and tending to contract when said members are extended, and a passageway between said expansible chamber and said first connecting means.

6. The device as recited in claim 5 wherein said first structure includes an outwardly depending flange on said first member, said flange being slidably engageable with said second member, and wherein said second structure includes an inwardly depending flange on said second member, said inwardly depending flange being slidably engageable with said first member.

7. The device as recited in claim 1 wherein said magnetic orifice comprises a body element having inlet and outlet passageways, said inlet passageway being in direct communication with said second cylinder, said outlet passageway being in direct communication with said third cylinder, and wherein said means for inducing a magnetic field includes a coil coupled to said body element, said passageways and coil being arranged in such relation with each other that said second fluid in said magnetic orifice is subjected to a maximum amount of magnetic flux.

8. The device as recited in claim 7 wherein said inlet passageway is connected to said outlet passageway by intermediate radial bores disposed along a plane substantially normal to the longitudinal axis of said coil.

9. The device as recited in claim 7 wherein said body element comprises magnteic material and said first and second members comprise non-magnetic material.

10. The device as recited in claim 7 with additionally an automatic control system for controlling the spring characteristic and the degree of damping of said device, comprising, a sensing device coupled to a body to be restrained by said device for detecting motion of said body to be restrained and for transmitting a signal in accordance with said motion, an amplifier connected to said sensing device for amplifying said signal, a source of electrical energy, an amplidyne unit connected between said amplifier and source of electrical energy and said coil, said amplidyne unit being responsive to said signal for controlling the current input from said source to said coil, and a feedback potentiometer coupled between said coil and said amplifier.

11. The device as recited in claim 10 with additionally a bypass switch between said source of electrical energy and said coil for providing lockout of said device.

12. In a unitary fluid spring, shock and lockout device for controlling the motion of a body to be restrained, said device having a cylinder and a piston movable therein, an improvement comprising, an additional cylinder having its interior in communication with the interior of the first cylinder, a fluid barrier in said second cylinder and operable therein to transmit fluid pressure from one end thereof to the other, a plurality of fluids in said device, one of said fluids being magnetic, means including a coil for magnetizing said magnetic fluid to vary the effective viscosity thereof and an automatic control system for controlling the spring characteristic and the degree of damping of said device, comprising, a sensing means coupled to said body to be restrained for detecting motion thereof and for transmitting a signal in accordance with said motion, an amplifier connected to said sensing means for amplifying said signal, a source of electrical energy, an amplidyne unit connected between said amplifier and source and coil, said amplidyne unit being responsive to said signal for controlling the current input from said source to said coil, and a feedback potentiometer coupled between said coil and said amplifier.

13. The invention as recited in claim 12 wherein said fluid barrier includes a floating piston.

14. The invention as recited in claim 12 with additionally a bypass switch between said source of electrical energy and said coil for providing lockout of said device.

15. In a unitary fluid spring, shock and lockout device for controlling the motion of a body to be restrained, said device having a cylinder and a piston movable therein, an improvement comprising, a pair of additional cylinders, said first cylinder and each of said pair of additional cylinders being in series communication, a fluid barrier in each of said additional cylinders and operable therein to transmit fluid pressure from one end thereof to the other end, a plurality of fluids in said device, one of said fluids being magnetic, a second of said fluids being relatively incompressible, a third of said fluids being highly compressible, and means including a coil for magnetizing said magnetic fluid to vary the effective viscosity thereof.

16. The invention as recited in claim 15 wherein said magnetic fluid is confined between said fluid barriers.

17. The invention as recited in claim 15 wherein each of said fluid barriers include a floating piston.

18. The invention as recited in claim 15 with additionally an automatic control system for controlling the spring characteristic and the degree of damping of said device, comprising, a sensing means coupled to said body to be restrained for detecting motion thereof and for transmitting a signal in accordance with said motion, an amplifier connected to said sensing means for amplifying said signal, a source of electrical energy, an amplidyne unit connected between said amplifier and source and coil, said amplidyne unit being responsive to said signal for controlling the current input from said source to said coil, and a feedback potentiometer coupled to said coil and said amplifier.

19. The invention as recited in claim 18 with additionally a bypass switch between said source of electrical energy and said coil for providing lockout of said device.

References Cited in the file of this patent

UNITED STATES PATENTS

| | | |
|---|---|---|
| 2,559,967 | Katz | July 10, 1951 |
| 2,846,028 | Gunther | Aug. 5, 1958 |
| 2,865,627 | Clement et al. | Dec. 23, 1958 |
| 2,873,963 | Taylor | Feb. 17, 1959 |
| 2,940,749 | Kemelhor | June 14, 1960 |
| 2,996,267 | Warren | Aug. 15, 1961 |